W. W. BYAM.
WHEEL.
APPLICATION FILED OCT. 6, 1911.
1,130,886.
Patented Mar. 9, 1915.
2 SHEETS—SHEET 1.
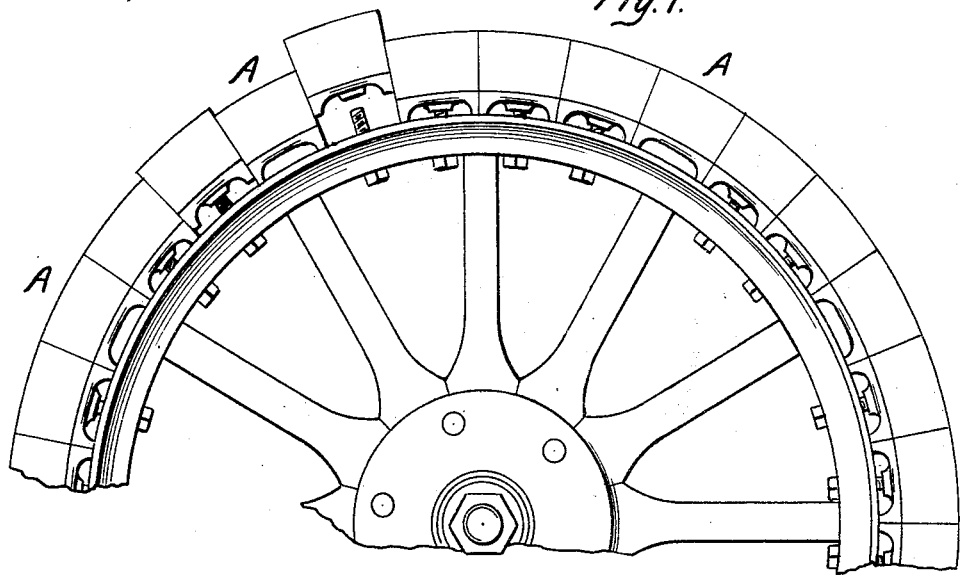
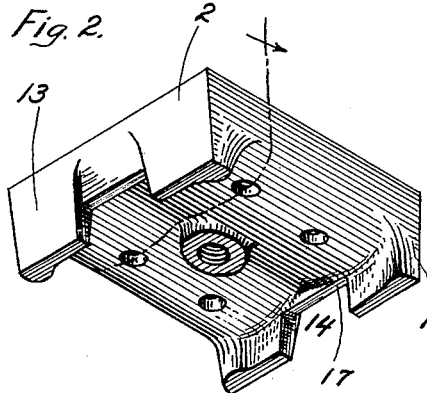
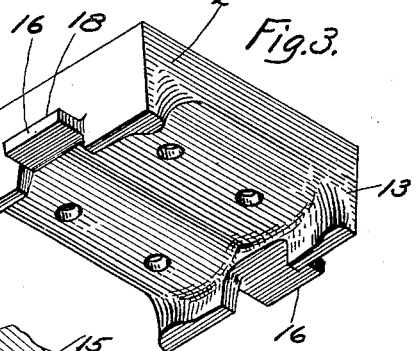
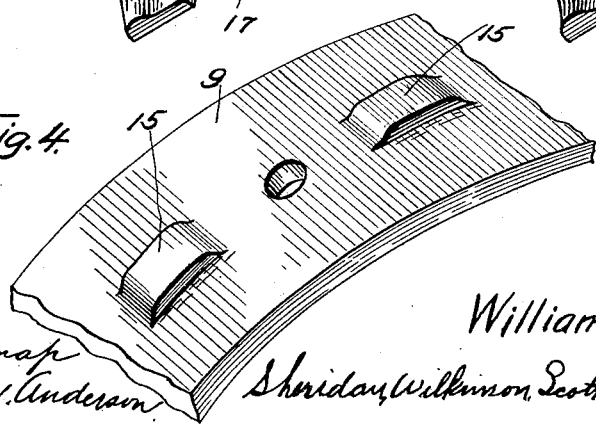
Witnesses:
Inventor:
William W. Byam
Sheridan, Wilkinson, Scott & Richmond
Attys W. W. BYAM.
WHEEL.
APPLICATION FILED OCT. 6, 1911.
1,130,886.
Patented Mar. 9, 1915.
2 SHEETS—SHEET 2.
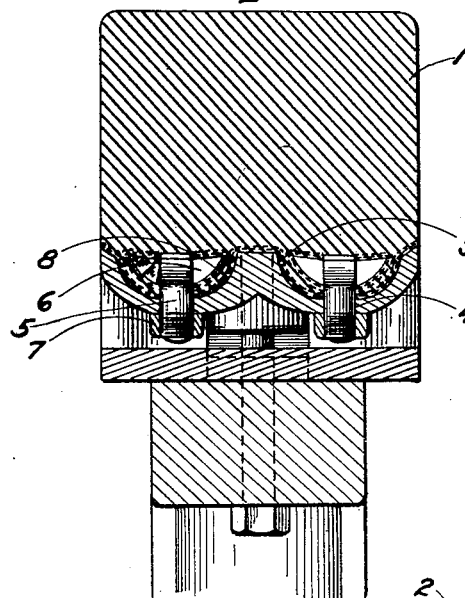
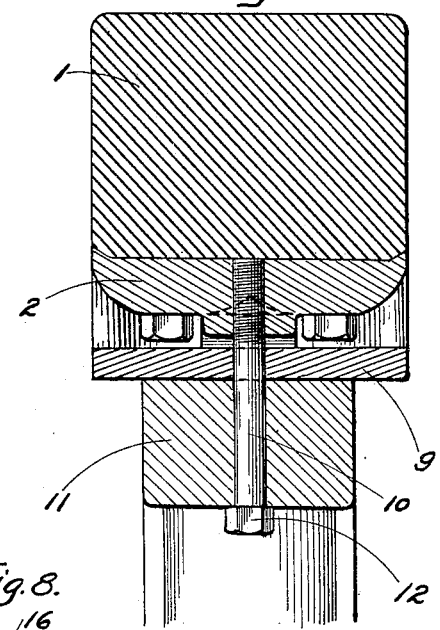
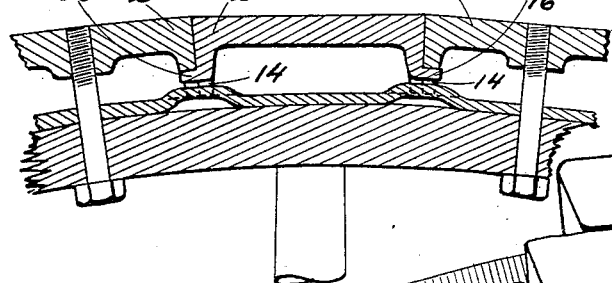
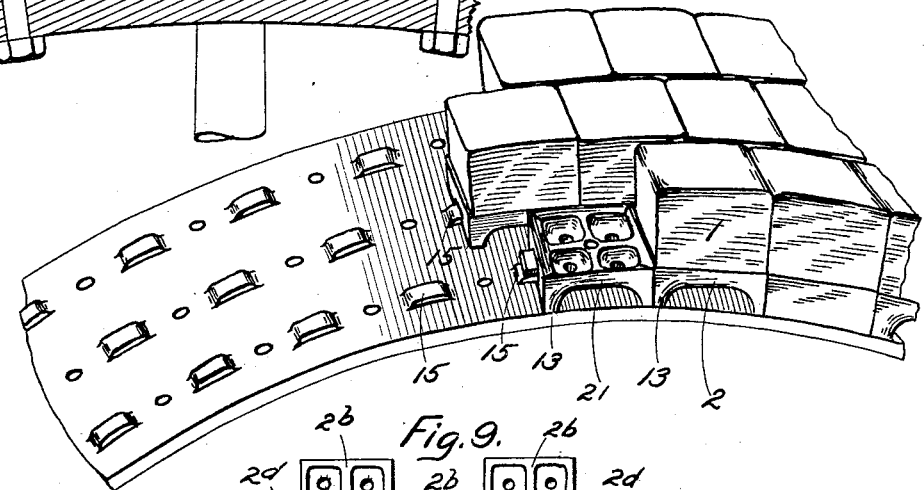
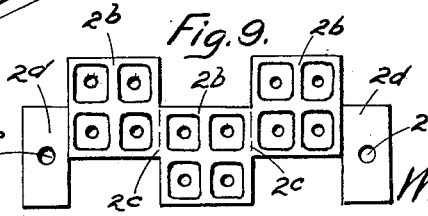
Witnesses:
C. C. Burnap
Edith M. Andrews
Inventor:
William W. Byam
By Sheridan, Wilkinson, Scott & Richmond
Att'ys

UNITED STATES PATENT OFFICE.

WILLIAM W. BYAM, OF CHICAGO, ILLINOIS, ASSIGNOR TO BYAM TIRE AND RIM COMPANY, A CORPORATION OF ILLINOIS.

WHEEL.

1,130,886. Specification of Letters Patent. Patented Mar. 9, 1915.

Application filed October 6, 1911. Serial No. 653,165.

*To all whom it may concern:*

Be it known that I, WILLIAM W. BYAM, a citizen of the United States, residing at Chicago, in the county of Cook and State of Illinois, have invented certain new and useful Improvements in Wheels, of which the following is a specification.

The object of my invention is to provide efficient means for securing resilient tires to the rims of wheels.

The particular purposes of my invention will more clearly appear from the following description and claims, taken in connection with the accompanying drawings, in which—

Figure 1 is a side view of part of a wheel equipped with my invention. Fig. 2 is a perspective view of a tire base segment. Fig. 3 is a perspective view of a tire base segment adapted to be used in connection with the segment shown in Fig. 2. Fig. 4 is a fragmentary perspective view of part of the outer side of the wheel rim. Fig. 5 is a transverse sectional view taken through the bolts which hold the resilient material to the tire base segment. Fig. 6 is a transverse sectional view through the bolt which holds the base segment shown in Fig. 2 to the rim. Fig. 7 is a fragmentary perspective view showing a wheel having a series of rows of tire segments. Fig. 8 is a fragmentary sectional view showing in detail the mode of attaching the segments to the rim opposite the end of the spoke. Fig. 9 is a view of a multiple block.

The invention claimed herein involves more particularly the means of applying the tire segments to the wheel, the means whereby the resilient tire material is secured to the rigid base being similar to that disclosed in my co-pending application 636,426, filed July 1, 1911.

As shown in Figs. 5, 6 and 7, the tire is formed of resilient material 1 which may consist of a series of segments secured to rigid metal base segments 2. Each of the base segments 2 is provided in its outer surface with a series of depressions 3 and bolt holes 4 extend from the bottom of said depressions through the base segment. Bolts 5 provided with heads 6 consisting of radiating arms are molded in the tire segments when the latter is formed. As described in my co-pending application above referred to, the bolt heads 6 are wrapped with webbing or fabric before the material of the tire is molded about them and similar webbing or fabric extends across the base of the resilient tire. As an alternative to the webbing, a coating of copper and shellac may be placed upon the bolt heads 6. In Fig. 5 the tire 1 is shown as being forced into intimate contact with the outer surface of the base segment. In order to draw the tire into intimate contact with the outer surface of the base segment, it is necessary to apply considerable force thereto by rotating the nut 7, the projections 8 upon the inner surface being normally of less depth than the depressions 3 in the base segments.

In order to avoid the necessity of having any parts overhanging or projecting beyond the edges of the felly-band 9, I secure the base segments 2 to the wheel by means of bolts 10 threaded at their outer extremities into the base segments 2 and passing through bolt holes in the felly-band 9 and felly 11. For convenience of terminology, I have referred in the claims to the outer part of the wheel including the felly-band 9 and felly 11 as the rim, intending thereby to designate the outer portion of the fixed part of the wheel however constructed. Bolts 10 are threaded at their inner ends and provided with heads 12 whereby the segments are drawn into secure contact with the felly-band 9.

In assembling the segments upon a wheel it frequently occurs that a segment will come directly opposite the end of a spoke, thereby rendering it impossible to secure the segment upon the rim by means of a bolt disposed in the position of the bolt 10 shown in Fig. 6. The segments designated A in Fig. 1 of the drawing occupy such a position. In order to secure segments occupying these positions to the wheel, I provide the form of segment illustrated in Fig. 3 and designated by the numeral 2′ and provide coacting parts upon the segment 2 illustrated in Fig. 2 for the purpose of holding the segments 2′ in place without bolts. Each of the segments whether of the form illustrated in Fig. 2 or that illustrated in Fig. 3 is provided at its ends with inwardly projecting flanges 13. When assembled the segments contact with the outer surface of the felly-band 9 only along the inner faces of the flanges 13, the central part of each of the segments being spaced away from the felly-band. By this means the same segments can be used upon wheels of all of the different diameters in use. If the segments contacted throughout their inner faces with the wheel rim it would be necessary to provide different segments for wheels of different diameters in order to secure a proper fit between the segments and rim. But by constructing the segments to contact with the rim only along comparatively narrow faces at their ends, the same segments may be used for wheels of different sizes. The circumferential distance through which the inner faces of the flanges contact with the rim is so short that the difference in curvature of the rims of different sized wheels does not interfere with the proper fitting of the segments thereon. Each of the inwardly projecting flanges 13 is provided with a recess 14 in which the projections 15 stamped outwardly upon the rim 9 are received. The engagement of the lugs 15 in the recess 14 serves as an additional means of holding the segments against sidewise displacement. The segments 2' shown in Fig. 3 are provided at their ends with outwardly extending lugs 16 designed to be received in the recess 14 of the segments 2 illustrated in Fig. 2 in such manner that the outer walls 17 of the recess 14 lie snugly against the outer surfaces 18 of the lugs 16.

It will be apparent that whenever on account of a spoke it is impossible to secure a segment in place by means of a bolt 10, as illustrated in Fig. 6, one of the segments 2' illustrated in Fig. 3 can be used. In such case the segment 2' is placed against the adjacent segment 2 with its lug 16 projecting into the recess 14 in the adjacent segment 2. The segment 2' will be of sufficient width to extend beyond the spoke, and another bolt held segment of the form illustrated in Fig. 2 will then be placed adjacent the other end of the segment 2' with its recess 14 embracing the other lug 16 of the segment 2'. The segment 2' will be held securely to the rim by means of its engagement with the bolt held segments at either end thereof.

While the segments may be made of any length circumferentially that is found desirable in practice, one convenient system is to make each of the segments of a circumferential length of 3.1416 inches. When so constructed one additional segment will be required for each inch increase in the diameter of the wheel. While this arrangement is simple and convenient, my invention is not restricted thereto, but contemplates any circumferential length of segments that may be found desirable.

In Fig. 9 I have shown a modification in the blocks which is more particularly adapted to wide rims. I prefer to call the form shown in Fig. 9 a multiple block. It consists of the blocks 2ᵇ which have a form similar to those previously described and are integrally joined together along the lines 2ᶜ. The outer blocks may be provided with flanges 2ᵈ in which are apertures 2ᵉ for the holding bolts.

While I have described one specific means of attaching the intermediate segments by engagement with the adjacent bolt held segments, my invention is not confined to the particular means described, but embraces any equivalent means whereby certain segments can be held to the rim by their engagement with adjacent segments directly secured to the rim. The specific form of the segments described and claimed herein in other respects may also be varied without departing from the spirit of my invention.

I claim:

1. In a device of the class described, a rim, a series of tire base segments, each of said segments contacting with said rim at its ends and being spaced therefrom between its ends, and means for securing said segments to said rim.

2. In a device of the class described, a rim, a series of intermediate and directly secured base segments, each of said segments having an inwardly projecting flange at each end resting upon said rim, each of said flanges having a recess in its inner edge, outwardly projecting lugs upon said rim engaging said recesses, and means for securing said directly secured segments to said rim, said intermediate segments having lugs engaging the flange recesses in the adjacent directly secured segments.

3. In a device of the class described a rim, a series of tire base segments, each of said base segments having two inwardly projecting flanges extending transversely of said segments and rim, said rim and segments contacting only on the comparatively narrow edges of said flanges whereby said segments conform with substantial accuracy to rims of different diameters.

In testimony whereof, I have subscribed my name.

WILLIAM W. BYAM.

Witnesses:
HENRY A. PARKS,
EDYTHE H. ANDERSON.